United States Patent
Chen

(10) Patent No.: US 12,348,302 B1
(45) Date of Patent: Jul. 1, 2025

(54) METHOD AND A SYSTEM FOR TIME SYNCHRONIZATION BASED ON OPTICAL TRANSMISSION NETWORK, AND STORAGE MEDIUM

(71) Applicant: RUIJIE NETWORKS CO., LTD., Fujian (CN)

(72) Inventor: Xiong Chen, Fuzhou (CN)

(73) Assignee: RUIJIE NETWORKS CO., LTD., Fuzhou (CN)

(*) Notice: Subject to any disclaimer, the term of this patent is extended or adjusted under 35 U.S.C. 154(b) by 0 days.

(21) Appl. No.: 19/173,959

(22) Filed: Apr. 9, 2025

Related U.S. Application Data

(63) Continuation of application No. PCT/CN2024/118639, filed on Sep. 12, 2024.

(30) Foreign Application Priority Data

Sep. 15, 2023 (CN) .......................... 202311196894.1

(51) Int. Cl.
H04J 3/06 (2006.01)
(52) U.S. Cl.
CPC .................................. H04J 3/0638 (2013.01)
(58) Field of Classification Search
CPC ..................................................... H04J 3/0635
See application file for complete search history.

(56) References Cited

U.S. PATENT DOCUMENTS

| 2014/0199072 | A1 | 7/2014 | Nuijts et al. |
| 2022/0329337 | A1* | 10/2022 | Anand ............... H04Q 11/0067 |
| 2023/0379075 | A1* | 11/2023 | Thyni ................... H04J 3/0667 |
| 2025/0068581 | A1* | 2/2025 | Coolidge ................. G06F 1/12 |

FOREIGN PATENT DOCUMENTS

| CN | 101051923 A | 10/2007 |
| CN | 106301642 A | 1/2017 |
| CN | 110324104 A | 10/2019 |
| CN | 110708135 A | 1/2020 |

OTHER PUBLICATIONS

International Search Report and Written Opinion of the International Searching Authority issued on Oct. 22, 2024, in corresponding International Application No. PCT/CN2024/118639; 11 pages.

* cited by examiner

*Primary Examiner* — Shi K Li
(74) *Attorney, Agent, or Firm* — Maier & Maier, PLLC

(57) ABSTRACT

A method and a system for time synchronization based on an optical transmission network, and a storage medium. On a user terminal device side, a first identity is selected from one or more identities in a first identity set according to a preset selection rule, and added to a delay request packet to obtain a first delay request packet carrying the first identity. The first delay request packet is sent to a central office device through an optical splitter. In response to a received first delay request response packet carrying time synchronization information and the first identity, time synchronization is performed between a first user terminal device and the central office device based on the time synchronization information and the first identity.

19 Claims, 8 Drawing Sheets

METHOD AND A SYSTEM FOR TIME SYNCHRONIZATION BASED ON OPTICAL TRANSMISSION NETWORK, AND STORAGE MEDIUM

CROSS-REFERENCE TO RELATED APPLICATIONS

This application is a continuation of PCT international application No. PCT/CN2024/118639 filed on Sep. 12 2024, which claims priority to Chinese Patent Application No. 202311196894.1, filed with the China National Intellectual Property Administration on Sep. 15, 2024 and entitled "METHOD AND APPARATUS FOR TIME SYNCHRONIZATION BASED ON OPTICAL TRANSMISSION NETWORK, AND ELECTRONIC DEVICE", which are incorporated herein by reference in its entirety.

TECHNICAL FIELD

This application relates to the field of communication technologies, and in particular, to a method and a system for time synchronization based on an optical transmission network, and a storage medium.

BACKGROUND

Currently, an Ethernet system implements time synchronization between a central office device and a user terminal device by using the Precision Clock Synchronization Protocol (Precision Clock Synchronization Protocol, PCSP) defined in IEEE 1588 for networked measurement and control systems, also known as the Precision Time Protocol (Precision Time Protocol, PTP).

The following describes a process of time synchronization between the central office device and the user terminal device based on the IEEE 1588 protocol. The central office device sends a synchronization packet to the user terminal device, and after sending the synchronization packet, sends a follow-up packet carrying a timestamp t1 (time at which the central office device sends the synchronization packet). The user terminal device receives the synchronization packet, records a timestamp t2 of receiving the synchronization packet, and receives the follow-up packet to obtain the timestamp t1. After obtaining the timestamp t1 and the timestamp t2, the user terminal device sends a delay request packet to the central office device, and records a timestamp t3 of sending the delay request packet. When receiving the delay request packet, the central office device records a timestamp t4 of receiving the delay request packet, and then sends a delay request response packet carrying the timestamp t4 to the user terminal device. After receiving the delay request response packet, the user terminal device obtains the timestamp t4, determines a time offset and a link delay with reference to the timestamp t1, the timestamp t2, and the timestamp t3, and corrects a clock based on the time offset and the link delay to implement time synchronization with the central office device.

SUMMARY

Exemplary embodiments of this application provide a method and a system for time synchronization based on an optical transmission network, and a storage medium. According to a first aspect, exemplary embodiments of this application provide a method for time synchronization based on an optical transmission network, applied to a first user terminal device, where the first user terminal device is optically connected to a central office device through an optical splitter, and the method includes:

selecting a first identity from one or more identities in a first identity set according to a preset selection rule, and adding the first identity to a delay request packet to obtain a first delay request packet carrying the first identity, where the preset selection rule includes a rule for selecting the first identity from the one or more identities, the first identity set is used to identify the first user terminal device, and the one or more identities are used to indicate delay request packets sent by the first user terminal device at different times;

sending the first delay request packet to the central office device through the optical splitter; and in response to a received first delay request response packet carrying time synchronization information and the first identity, performing time synchronization between the first user terminal device and the central office device based on the time synchronization information and the first identity.

Different user terminal devices add respective identities from their available identity sets to their delay request packets to be sent, so that when the central office device receives a plurality of delay request packets, the central office device can determine, based on the identities in the delay request packets, which user terminal devices the plurality of delay request packets come from, and then can send delay request response packets to the corresponding user terminal devices respectively. In this way, a plurality of user terminal devices can implement time synchronization with the same central office device.

In an embodiment, before the selecting the first identity from the one or more identities in the first identity set according to the preset selection rule, and adding the first identity to the delay request packet, the method further includes: receiving the first identity set from the central office device.

In an embodiment, the receiving the first identity set from the central office device includes:

in response to a received identity request response packet carrying the first identity set, obtaining the first identity set by parsing the identity request response packet.

In an embodiment, before the receiving the first identity set sent by the central office device, the method further includes: in response to the number of consecutive times that obtained synchronization time offsets are within a specified range being greater than or equal to a first preset number, sending, to the central office device, an identity request packet carrying a first address corresponding to the first user terminal device; and/or in response to the number of consecutive times that the obtained synchronization time offsets are within the specified range being less than the first preset number, performing the time synchronization on the first user terminal device.

In an embodiment, the method further includes: in response to a received single-step synchronization packet, obtaining a synchronization time offset of the first user terminal device.

In an embodiment, the obtaining the synchronization time offset of the first user terminal device in response to the received single-step synchronization packet includes: in response to the received single-step synchronization packet, obtaining a first time at which the central office device sends the single-step synchronization packet and a second time at which the first user terminal receives the single-step synchronization packet; and determining the synchronization time offset based on the first time and the second time.

In an embodiment, the single-step synchronization packet includes a synchronization packet and a follow-up packet corresponding to the synchronization packet, and the obtaining, in response to the received single-step synchronization packet, the first time at which the central office device sends the single-step synchronization packet and the second time at which the first user terminal receives the single-step synchronization packet includes: in response to the received follow-up packet, obtaining the first time; and in response to the received synchronization packet, obtaining the second time.

In an embodiment, the single-step synchronization packet includes port information of the central office device, and the port information indicates a port used to send the single-step synchronization packet.

In an embodiment, the number of the one or more identities is based on storage space allocated by the central office device for the identities and a maximum split ratio of the optical splitter.

In an embodiment, the preset selection rule includes at least one of the following rules: randomly selecting the first identity from the one or more identities, where a time interval between two consecutive selections of the first identity is greater than or equal to a time interval threshold; or selecting the first identity from the one or more identities in a polling manner.

In an embodiment, the performing the time synchronization between the first user terminal device and the central office device based on the time synchronization information and the first identity includes: obtaining, based on the first identity, a third time at which the first user terminal device sends the first delay request packet.

In an embodiment, the performing the time synchronization between the first user terminal device and the central office device based on the time synchronization information includes: obtaining the time synchronization information by parsing the first delay request response packet; and determining a link delay based on the time synchronization information.

In an embodiment, after the determining the link delay based on the time synchronization information, the method further includes: in response to the number of consecutive times that the determined link delay is greater than or equal to the preset threshold being greater than or equal to a second preset number, sending a delay request packet to the central office device at a first frequency, where the first frequency is used to indicate a frequency at which the first user terminal device sends the delay request packet to the central office device; and in response to the number of consecutive times that the determined link delay is less than the preset threshold being greater than or equal to the third preset number, sending the delay request packet to the central office device at a second frequency, where the second frequency is used to indicate a frequency at which the first user terminal device sends the delay request packet to the central office device, and the second frequency is lower than the first frequency.

In an embodiment, the method further includes: if the first delay request response packet carrying the time synchronization information and the first identity is not received within a preset time, sending a second delay request packet carrying a second identity to the central office device, where the second identity is an identity selected from the one or more identities according to the preset selection rule, and the second identity is different from the first identity.

In an embodiment, before the selecting the first identity from the first identity set according to the preset selection rule, and adding the first identity to the generated delay request packet, the method further includes: in response to determined synchronization time offsets being all within a specified range for a plurality of consecutive times, sending an identity request packet carrying a first address to the central office device, where the synchronization time offset is a difference between a time at which the first user terminal device receives a synchronization packet and a time at which the central office device sends the synchronization packet, and the first address is used to identify the first user terminal device; and when receiving the identity request response packet carrying the first identity set, parsing the identity request response packet to obtain the first identity set.

After the synchronization time offset becomes stable within the specified range, the identity request packet is sent to the central office device. In this way, a packet loss rate of the identity request packet and a packet loss rate of the identity request response packet can be reduced. A purpose of sending an identity request packet to the central office device is to allow the central office device to allocate an identity set to each user terminal device, so that the central office device can subsequently determine, based on an identity in a delay request packet, an identity set to which the identity belongs and then determines a corresponding user terminal device based on the identity set.

In an embodiment, the receiving the first delay request response packet carrying the time synchronization information and the first identity includes: determining whether the first delay request response packet carrying the time synchronization information and the first identity is received; and if yes, parsing the first delay request response packet to obtain the time synchronization information, and determining the link delay based on the time synchronization information; or if no, resending the second delay request packet carrying the second identity to the central office device, where the second identity belongs to the first identity set.

In a current time synchronization scheme, when a delay request fails, a user terminal device may stop sending a delay request packet, wait for a central office device to start to send a synchronization packet again, and reset an entire synchronization process. However, in this application, when a delay request of the user terminal device fails, that is, when no delay request response packet is received, there is no need to reset the entire synchronization process. Instead, the user terminal device only needs to continue to resend the delay request packet to the central office device. Compared with resetting the entire synchronization process, this processing manner reduces waste of the time and resources and improves efficiency of time synchronization between the user terminal device and the central office device.

In an embodiment, after the determining the link delay based on the time synchronization information, the method further includes: determining whether link delays determined for a plurality of consecutive times are all less than a preset threshold; and if no, resending the delay request packet carrying the identity in the first identity set to the central office device at the first frequency; or if yes, resending the delay request packet carrying the identity in the first identity set to the central office device at the second frequency, where the second frequency is lower than the first frequency.

When the user terminal device is not online, an uplink bandwidth is low and uplink traffic is unstable. In this case, the packet loss rate of the delay request packet sent by the user terminal device is high, and a probability that the delay request packet is successfully received is increased by increasing the sending frequency for sending the delay request packet. When the link delays determined for the plurality of consecutive times are all less than the preset threshold, it indicates that the user terminal device is online. Therefore, the sending frequency for sending the delay request packet can be reduced, thereby reducing delay request packets and delay request response packets in the optical transmission network and preventing congestion in the optical transmission network.

In an embodiment, before the sending the identity request packet carrying the first address to the central office device in response to the determined synchronization time offsets being all within the specified range for the plurality of consecutive times, the method further includes: receiving the synchronization packet and the follow-up packet through the optical splitter; recording a receiving time when the synchronization packet is received, and obtaining, from the follow-up packet, a sending time at which the central office device sends the synchronization packet; and determining the synchronization time offset based on the sending time and the receiving time.

According to a second aspect, exemplary embodiments of this application provide a method for time synchronization based on optical communication, where the method is applied to a central office device, the central office device is optically connected to a plurality of user terminal devices through an optical splitter, and the method includes:

when receiving a first delay request packet carrying a first identity and sent by a first user terminal device, determining a first identity set to which the first identity belongs, where different identity sets correspond to different user terminal devices, and identities in a same identity set are used to distinguish between delay request packets sent by a same user terminal device at different times;

determining, based on a correspondence between an identity set and a user terminal device, the first user terminal device corresponding to the first identity set; and sending a first delay request response packet carrying time synchronization information and the first identity to the first user terminal device through the optical splitter, where the first user terminal device is any one of the plurality of user terminal devices.

When the central office device receives a delay request packet, the central office device determines, based on an identity in the delay request packet, an identity set to which the identity belongs, then determines a corresponding user terminal device based on the identity set, and then sends a corresponding delay request response packet to the corresponding user terminal device, thereby avoiding a case that when the plurality of user terminal devices are connected to the central office device, it is impossible to determine which user terminal device the delay request packet comes from and therefore impossible to accurately send the delay request response packet to the corresponding user terminal device.

In an embodiment, before the determining the first identity set to which the first identity belongs, the method further includes: when receiving an identity request packet sent by the first user terminal device, parsing the identity request packet to obtain a first address, where the first address is used to identify the first user terminal device; determining the first user terminal device based on the first address, and allocating the first identity set to the first user terminal device; and sending, based on the first address, an identity request response packet carrying the first identity set to the first user terminal device.

A message type of an identity request is added to the original IEEE 1588 protocol. A user terminal sends an identity request packet to the central office device, and the central office device sends an identity request response packet carrying an identity set to the user terminal device. An exclusive identity set is allocated to each user terminal device, so that the central office device subsequently determines, based on the identity in the delay request packet, the identity set to which the identity belongs, and then determines the corresponding user terminal device based on the identity set.

In an embodiment, after the sending the identity request response packet carrying the first identity set to the first user terminal device, the method further includes: determining whether the first address is parsed again in an identity request packet received within a preset time period; and if yes, sending an identity request response packet carrying the first identity set to the first user terminal device corresponding to the first address; or if no, and a second address is parsed in the identity request packet received within the preset time period, sending an identity request response packet carrying the first identity set to a second user terminal device corresponding to the second address, where the second address is used to identify the second user terminal device, and the second user terminal device is a newly connected user terminal device.

When the first user terminal device goes offline, the allocation of the first identity set is suspended. When the first user terminal device is replaced with the newly connected user terminal device, the first identity set is directly allocated to the newly connected user terminal device for use, thereby avoiding waste of identity resources.

In an embodiment, before the parsing the identity request packet to obtain the first address when receiving the identity request packet sent by the first user terminal device, the method further includes: when the central office device sends a synchronization packet and a follow-up packet, obtaining a port number in header information of the synchronization packet and the port number in header information of the follow-up packet; and sending the synchronization packet and the follow-up packet to an optical splitter corresponding to the port number.

When the central office device generates PTP packets, header information of the PTP packets may be filled with ports in the IEEE 1588 standard protocol, thereby controlling the generated PTP packets to be sent to optical splitters corresponding to the ports.

According to a third aspect, exemplary embodiments of this application provide an apparatus for time synchronization based on an optical transmission network, where the apparatus is a first user terminal device, or the apparatus is applied to the first user terminal device, the first user terminal device is optically connected to a central office device through an optical splitter, and the apparatus includes:

a packet generation unit, configured to select a first identity from a first identity set according to a preset selection rule, and add the first identity to a generated delay request packet to obtain a first delay request packet carrying the first identity, where different identity sets correspond to different user terminal devices, and identities in a same identity set are used to distinguish between delay request packets sent by a same user terminal device at different times;

a packet sending unit, configured to send the first delay request packet to the central office device through the optical splitter; and a packet receiving unit, configured to receive a first delay request response packet carrying time synchronization information and the first identity, where the time synchronization information is used for time synchronization between the first user terminal device and the central office device.

In an embodiment, the apparatus is further configured to: in response to determined synchronization time offsets being all within a specified range for a plurality of consecutive times, send an identity request packet carrying a first address to the central office device, where the synchronization time offset is a difference between a time at which the first user terminal device receives a synchronization packet and a time at which the central office device sends the synchronization packet, and the first address is used to identify the first user terminal device; and when receiving the identity request response packet carrying the first identity set, parse the identity request response packet to obtain the first identity set.

In an embodiment, the packet receiving unit is configured to: determine whether the first delay request response packet carrying the time synchronization information and the first identity is received; and if yes, parse the first delay request response packet to obtain the time synchronization information, and determine a link delay based on the time synchronization information; or if no, resend a second delay request packet carrying a second identity to the central office device, where the second identity belongs to the first identity set.

In an embodiment, the apparatus is further configured to: determine whether each of consecutive link delays is less than a preset threshold; and if no, resend the delay request packet carrying the identity in the first identity set to the central office device at a first frequency; or if yes, resend the delay request packet carrying the identity in the first identity set to the central office device at a second frequency, where the second frequency is lower than the first frequency.

According to a fourth aspect, exemplary embodiments of this application further provide an apparatus for time synchronization based on optical communication, where the apparatus is a central office device, or the apparatus is applied to the central office device, the central office device is optically connected to a plurality of user terminal devices through an optical splitter, and the apparatus includes:

a first determining unit, configured to: when a first delay request packet carrying a first identity and sent by a first user terminal device is received, determine a first identity set to which the first identity belongs, where different identity sets correspond to different user terminal devices, and identities in a same identity set are used to distinguish between delay request packets sent by a same user terminal device at different times;

a second determining unit, configured to determine, based on a correspondence between an identity set and a user terminal device, the first user terminal device corresponding to the first identity set; and a packet sending unit, configured to send a first delay request response packet carrying time synchronization information and the first identity to the first user terminal device through the optical splitter, where the first user terminal device is any one of the plurality of user terminal devices.

In an embodiment, the apparatus is further configured to: when an identity request packet sent by the first user terminal device is received, parse the identity request packet to obtain a first address, where the first address is a physical address of the first user terminal device; determine the first user terminal device based on the first address, and allocate the first identity set to the first user terminal device; and send, based on the first address, an identity request response packet carrying the first identity set to the first user terminal device.

In an embodiment, the apparatus is further configured to: determine whether the first address is parsed again in an identity request packet received within a preset time period; and if yes, send an identity request response packet carrying the first identity set to the first user terminal device corresponding to the first address; or if no, and a second address is parsed in the identity request packet received within the preset time period, send an identity request response packet carrying the first identity set to a second user terminal device corresponding to the second address, where the second address is used to identify the second user terminal device, and the second user terminal device is a newly connected user terminal device.

According to a fifth aspect, exemplary embodiments of this application provide an electronic device. The electronic device includes:

a memory, configured to store a computer program; and a processor, configured to execute the computer program stored in the memory, to implement the steps of the foregoing method for time synchronization based on optical communication.

According to a sixth aspect, exemplary embodiments of this application provide a computer-readable storage medium. A computer program is stored in the computer-readable storage medium. When the computer program is executed by a processor, the steps of the foregoing method for time synchronization based on optical communication are implemented.

According to a seventh aspect, exemplary embodiments of this application provide a computer program product. A computer program is stored in the computer program product. When the computer program is executed by a processor, the steps of the foregoing method for time synchronization based on optical communication are implemented.

For any one of the second aspect to the seventh aspect and technical effects that can be achieved in the aspects, refer to descriptions of technical effects that can be achieved in the first aspect or various possible solutions in the first aspect. Details are not described herein again.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DETAILED DESCRIPTION OF EMBODIMENTS

Figure 1:
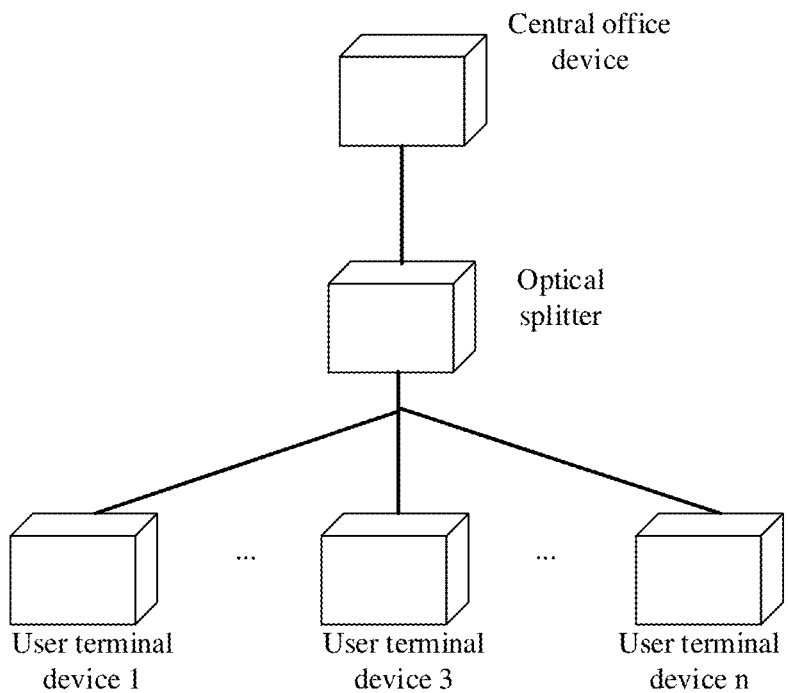
FIG. 1 is a schematic diagram of an Ethernet passive optical network (Ethernet Passive Optical Network, EPON) system according to an embodiment of this application.

To make the objectives, technical solutions, and advantages of this application clearer, the following clearly and thoroughly describes the technical solutions of this application with reference to the accompanying drawings in the embodiments of this application. Apparently, the described embodiments are some but not all of the embodiments of the technical solutions of this application. All other embodiments obtained by a person of ordinary skill in the art based on the embodiments described in this application document without creative efforts shall fall within the protection scope of the technical solutions of this application.

In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, system, product, or device. The term "a plurality of" in this application may mean at least two, for example, two, three, or more. However, the embodiments of this application are not limited thereto.

In the description of this application, the term "a plurality of" is understood as "at least two". The term "and/or" describes an association relationship between associated objects and represents that three relationships may exist. For example, A and/or B may represent the following three cases: Only A exists, both A and B exist, and only B exists. A connection between A and B may represent two cases: A is directly connected to B, and A is connected to B through C. In addition, in the description of this application, terms such as "first" and "second" are used only for distinguishing descriptions, but cannot be understood as an indication or implication of relative importance, or as an indication or implication of a sequence.

Currently, the IEEE 1588 protocol is predominantly used to implement time synchronization between a central office device and a connected user terminal device. The process of implementing time synchronization is described as follows: The central office device sends a synchronization packet to the user terminal device by using the IEEE 1588 protocol, and after sending the synchronization packet, sends a follow-up packet carrying a timestamp t1 (time at which the central office device sends the synchronization packet). The user terminal device receives the synchronization packet, records a timestamp t2 of receiving the synchronization packet, and receives the follow-up packet to obtain the timestamp t1. After obtaining the timestamp t1 and the timestamp t2, the user terminal device sends a delay request packet to the central office device, and records a timestamp t3 of sending the delay request packet. When receiving the delay request packet, the central office device records a timestamp t4 of receiving the delay request packet, and then sends a delay request response packet carrying the timestamp t4 to the user terminal device. After receiving the delay request response packet, the user terminal device obtains the timestamp t4, determines a time offset and a link delay with reference to the timestamp t1, the timestamp t2, and the timestamp t3, and corrects a clock based on the time offset and the link delay to implement time synchronization with the central office device.

In the foregoing process of implementing time synchronization between the user terminal device and the central office device based on the IEEE 1588 protocol, when a delay request of the user terminal device fails, that is, when the delay request response packet sent by the central office device is not received, the entire synchronization process may be reset, and the central office device starts to send a synchronization packet to the user terminal device again. In other words, when one central office device communicates with a plurality of user terminal devices, this processing manner of resetting the entire synchronization process may severely reduce efficiency of time synchronization between the user terminal device and the central office device, resulting in time waste.

In addition, the current IEEE 1588 protocol is applicable only to a scenario in which one user terminal device is synchronized with one central office device, and not applicable to a scenario in which a plurality of user terminal devices are synchronized with one central office device, because in the synchronization process, each user terminal device may periodically send a delay request packet to the central office device, and each delay request packet sent by the same user terminal device may carry an ID, but the IDs each increase from 0, resulting in presence of delay request packets with the same ID among the delay request packets received by the central office device. For example, in FIG. 1, a central office device receives a delay request packet with an ID of 1 sent by user terminal device 1 at a time t1, and receives a delay request packet with an ID of 1 sent by user terminal device 3 at a time t2. Therefore, the central office device cannot determine which user terminal device sends the delay request packet with the same ID, and cannot correctly send a delay request response packet carrying a timestamp t4 to a corresponding user terminal device, which further makes the user terminal device unable to implement time synchronization with the central office device.

Exemplary embodiments of this application provide a method for time synchronization based on an optical transmission network. The following further describes this application in detail with reference to the accompanying drawings.

Figure 2:
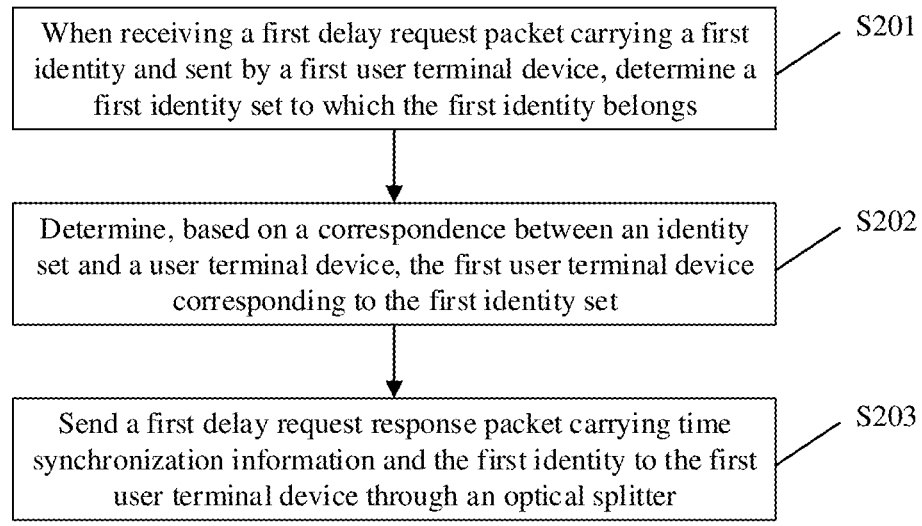
FIG. 2 is a schematic diagram of a method for time synchronization based on an optical transmission network according to an embodiment of this application.

FIG. 2 is a schematic flowchart of a method for time synchronization based on optical communication according to an embodiment of this application. The method is applied to a central office device, and the central office device is optically connected to a plurality of user terminal devices through an optical splitter. The method includes the following steps.

S201: When receiving a first delay request packet carrying a first identity and sent by a first user terminal device, determine a first identity set to which the first identity belongs.

S202: Determine, based on a correspondence between an identity set and a user terminal device, the first user terminal device corresponding to the first identity set.

S203: Send a first delay request response packet carrying time synchronization information and the first identity to the first user terminal device through the optical splitter.

The method in this embodiment of this application can be applied to a network topology shown in FIG. 1, the first delay request packet is transmitted by the first user terminal device, and the first user terminal device is any one of n user terminal devices, where n is an integer greater than 1. Before the first user terminal device transmits the first delay request packet, the central office device needs to allocate the first identity set to the first user terminal device, where the first identity set includes a plurality of identities, and the identities are used to be added to delay request packets sent by the first user terminal device and are used to distinguish between delay request packets sent by the first user terminal device at different times. Different identity sets are allocated to different user terminal devices, and identities in a same identity set are used to distinguish between delay request packets sent by a same user terminal device at different times. The following describes in detail a process in which the central office device allocates the first identity set to the first user terminal device.

Figure 3:
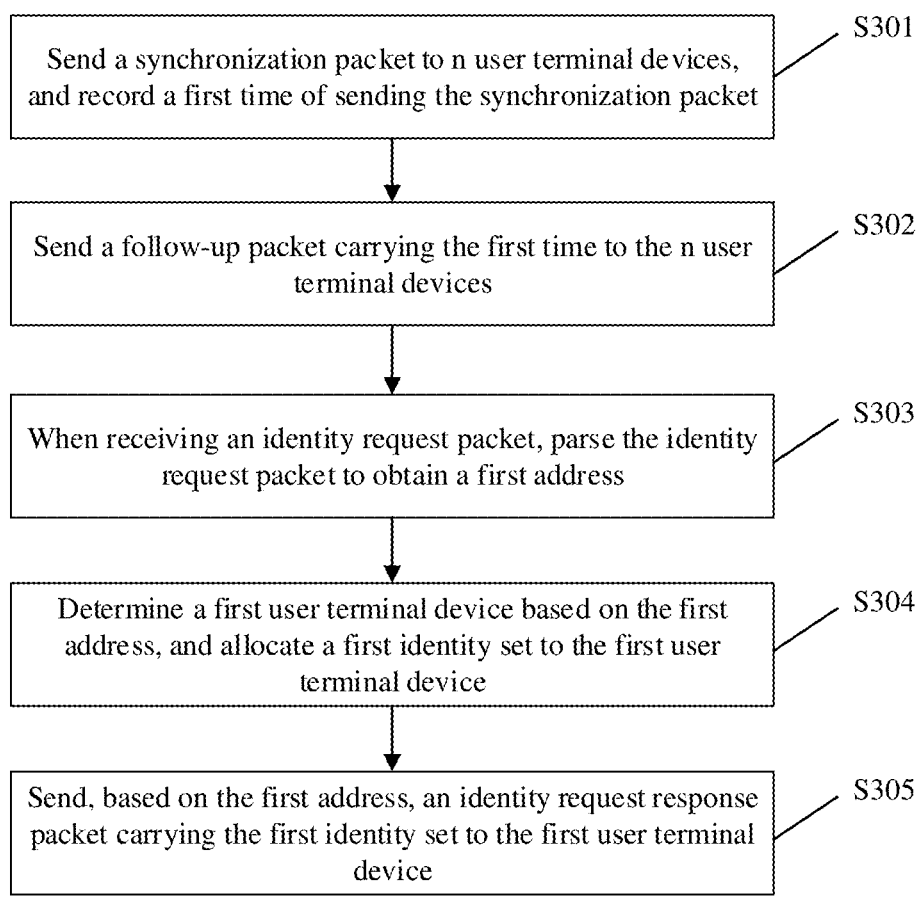
FIG. 3 is a schematic diagram of a procedure in which a central office device allocates an identity set according to an embodiment of this application.

FIG. 3 is a schematic diagram of a procedure in which the central office device allocates the first identity set to the first user terminal device.

S301: Send a synchronization packet to n user terminal devices, and record a first time of sending the synchronization packet.

Specifically, in the process of time synchronization between the central office device and the n user terminal devices connected to the central office device, the central office device may first broadcast a Sync packet (synchronization packet) and record a first time of sending the Sync packet. The Sync packet may be a PTP packet, and a manner of sending the Sync packet may be irregular periodic sending or regular periodic sending.

Figure 4:
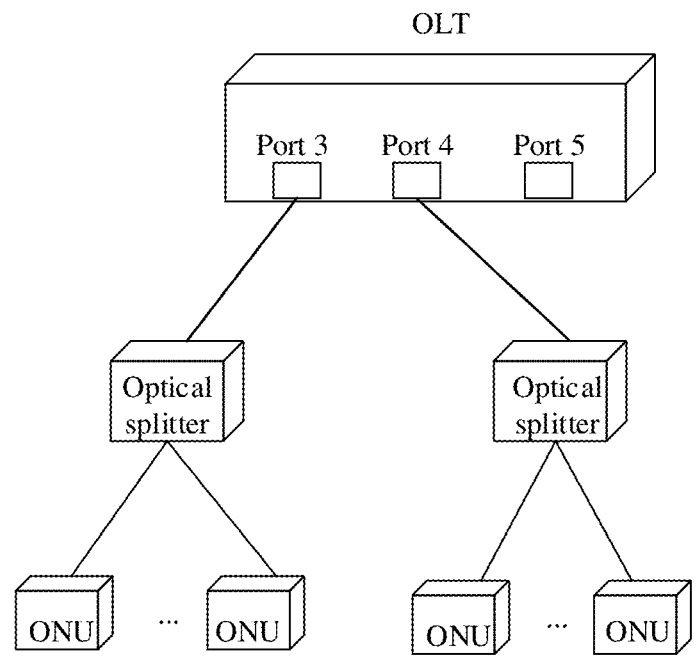
FIG. 4 is a schematic diagram of an application scenario of a method for time synchronization based on an optical transmission network according to an embodiment of this application.

It should be noted that portIdentity in IEEE 1588 standard protocol header information is used to indicate a port (interface) number in different network adapters, indicating that the port uses the IEEE 1588 standard protocol, that is, a PTP packet can be sent through this port.

portIdentity is applicable only to a scenario in which there is only one port in a network adapter. For example, port 1 corresponds to OLT 1, and port 2 corresponds to OLT 2 (the OLT is an optical line terminal, a type of central office device). When a plurality of ports in a network adapter of a central office device use the IEEE 1588 standard protocol, for example, as shown in FIG. 4, three ports, port 3, port 4, and port 5, in a network adapter of an OLT can use the IEEE 1588 standard protocol, it is impossible to determine through which port a PTP packet is to be sent.

Therefore, in this embodiment of this application, when a plurality of ports in a network adapter of a central office device can use the IEEE 1588 standard protocol, a reserved field of PTP packet standard header information is filled with sequence numbers of these ports, so that when a PTP packet is being sent, the PTP packet can be controlled to be sent to a corresponding port after the reserved field is parsed. For example, the following ports in a network adapter of a central office device can use the IEEE 1588 standard protocol: port 3, port 4, and port 5. When a PTP packet needs to be sent to port 3, a reserved field of PTP packet standard header information is filled with a sequence number of port 3. When a PTP packet needs to be sent to port 3 and port 4, a reserved field of PTP packet standard header information is filled with sequence numbers of port 3 and port 4.

S302: Send a follow-up packet carrying the first time to the n user terminal devices.

Specifically, after the central office device records the first time of sending the synchronization packet, information indicating the first time is encapsulated, for example, into a follow-up packet (follow-up packet), and the follow-up packet is sent to the n user terminal devices. The follow-up packet is a multicast PTP packet. It should be understood that in this embodiment of the present invention, all user terminal devices connected to a same optical splitter are a group.

When receiving the Sync packet, the first user terminal device records a second time of receiving the Sync packet. When receiving the follow-up packet, the first user terminal device obtains the first time from the follow-up packet, and then calculates a synchronization time offset between the second time and the first time. Because the Sync packet is sent periodically, the follow-up packet is also sent periodically, and a synchronization time offset can be obtained every time the Sync packet and the follow-up packet are sent. When synchronization time offsets calculated for a plurality of consecutive times are all within a specified range, for example, when synchronization time offsets calculated for consecutive preset times, such as three times, are all within a sub-microsecond range, the first user terminal device starts to send an identity request packet to the central office device to request the central office device to allocate an identity set to the first user terminal device. The identity request packet carries a first address, and the first address is used to identify the first user terminal device. Any information that can uniquely identify the user terminal device can be used as the first address. For example, the first address may be a MAC address (physical address) of the first user terminal device. Because a MAC address of each user terminal device is unique, the central office device can determine, based on the MAC address in the identity request packet, the user terminal device requesting the allocation of the identity set.

S303: When receiving the identity request packet, parse the identity request packet to obtain the first address.

In this embodiment of this application, when receiving the identity request packet, the central office device parses the identity request packet to obtain the first address, where the first address is used to identify the first user terminal device, and the first address is the MAC address of the first user terminal device.

It should be noted that the existing IEEE 1588 standard protocol does not define a message type for an identity request. In the method provided in this embodiment of this application, the message type of the identity request is added in the IEEE 1588 standard protocol and used to request and allocate an identity. The message type of the identity request includes: an identity request packet and an identity request response packet. The identity request packet and the identity request response packet may be layer-2 MAC packets.

S304: Determine the first user terminal device based on the first address, and allocate the first identity set to the first user terminal device.

Specifically, the central office device determines the first user terminal device based on the first address, and allocates the first identity set to the first user terminal device.

In an embodiment, a process of allocating an identity set may be: calculating the total number of identities in an identity set of each user terminal device based on a specified total identity range and a maximum split ratio of the optical splitter to which the central office device is connected. Using FIG. 5 as an example, assuming that the specified total identity range is 0x00 to 0xffff, that is, 0 to 65535 characters, and an optical splitter connected to a central office device OLT in FIG. 5 has 32 ports, the maximum split ratio is 1:32, and the total number of identities available for each user terminal device ONU connected to the optical splitter is 65536÷32=2048 characters.

Figure 5:
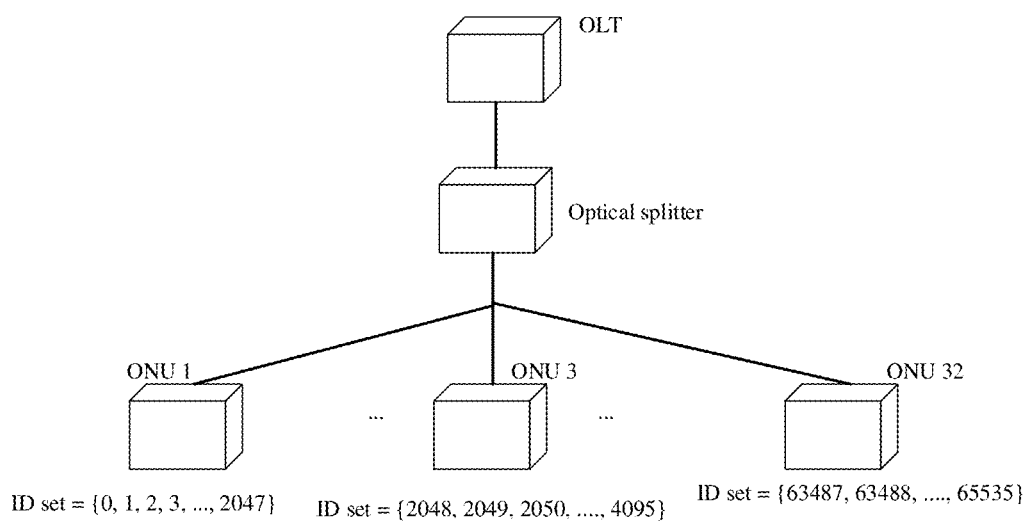
FIG. 5 is a schematic diagram of an application scenario of a method for time synchronization based on an optical transmission network according to an embodiment of this application.

In addition, an order of allocating an identity set to each user terminal device may be based on an order of receiving identity request packets sent by different user terminal devices. As shown in FIG. 5, after receiving an identity request packet sent by ONU 1, a first identity set is allocated to ONU 1, and an identity range of the first identity set is 0 to 2047 characters, for example, the first identity set is {0, 1, 2, 3, . . . , 2047}; and after receiving an identity request packet sent by ONU 2, a second identity set {2048, 2049, 2050, . . . , 4095} is allocated to ONU 2, and an identity range of the second identity set is 2048 to 4095 characters. Subsequently, an identity set is allocated to each ONU in sequence. Details are not described herein again.

S305: Send, based on the first address, an identity request response packet carrying the first identity set to the first user terminal device.

Specifically, after the central office device allocates the first identity set to the first user terminal device, the first identity set is encapsulated into the identity request response packet, and based on the parsed first address, the identity request response packet is sent to the first user terminal device corresponding to the first address. Herein, a manner of sending the identity request response packet may be sending by unicast. The manner of sending the identity request response packet is not limited in this embodiment of this application.

When receiving the identity request response packet carrying the first identity set, the first user terminal device parses the identity request response packet to obtain the first identity set, selects the first identity from the first identity set, adds the first identity to the generated delay request packet to obtain the first delay request packet carrying the first identity, and then sends the first delay request packet to the central office device.

In this embodiment of this application, the central office device may perform the operation of S201 in response to the received first delay request packet sent by the first user terminal device.

S201: When receiving the first delay request packet carrying the first identity and sent by the first user terminal device, determine the first identity set to which the first identity belongs.

Specifically, after receiving the first delay request packet, the central office device parses the first delay request packet to obtain the first identity, and determines, based on the first identity, the first identity set to which the first identity belongs.

S202: Determine, based on the correspondence between the identity set and the user terminal device, the first user terminal device corresponding to the first identity set.

It should be noted that different identity sets include different identities, and different identity sets are allocated to different user terminal devices, and identities in the same identity set are used to distinguish between delay request packets sent by the same user terminal device at different times.

Specifically, after determining the first identity set to which the first identity belongs, the first user terminal device corresponding to the first identity set is determined based on an allocation relationship between each identity set and each user terminal device. In this way, it is determined that the first delay request packet comes from the first user terminal device. For example, the allocation relationship between each identity set and each user terminal device may be shown in the following Table 1.

TABLE 1

|  | User terminal device | | | | |
| --- | --- | --- | --- | --- | --- |
|  | First user terminal device | Second user terminal device | Third user terminal device | . . . | $n^{th}$ user terminal device |
| Allocated identity set | First identity set | Second identity set | Third identity set | . . . | $n^{th}$ identity set |

S203: Send the first delay request response packet carrying the time synchronization information and the first identity to the first user terminal device through the optical splitter.

Specifically, the time synchronization information is a receiving time at which the central office device receives the first delay request packet. When receiving the first delay request packet, the central office device may record the receiving time at which the first delay request packet is received as the time synchronization information. After determining that the first identity set to which the first identity belongs corresponds to the first user terminal device, the time synchronization information is encapsulated into the first delay request response packet, and the first identity is also added to the first delay request response packet. Then the first delay request response packet carrying the time synchronization information and the first identity is sent to the first user terminal device. A manner of sending the first delay request response packet may be sending by unicast. The manner of sending the delay request response packet is not limited in this embodiment of this application.

In the foregoing method, because the central office device allocates a different and non-overlapping identity set to each user terminal device, the central office device determines, based on an identity in a received delay request packet, an identity set to which the identity belongs, then determines a corresponding user terminal device based on the identity set, and sends a delay request response packet carrying time synchronization information and the same identity to the corresponding user terminal device, thereby avoiding a case that it is impossible to determine the user terminal device sending the received delay request packet and therefore impossible to accurately send the delay request response packet carrying the time synchronization information to the corresponding user terminal device.

In addition, the central office device also adds the identity in the received delay request packet to the sent delay request response packet carrying the time synchronization information, so that the corresponding user terminal device can obtain, based on the identity, a sending time at which the delay request packet carrying the identity is sent, that is, a third time, where the third time corresponds to the time synchronization information, and then time synchronization is performed based on the third time and the time synchronization information, thereby improving accuracy of time synchronization.

Because the user terminal device may be offline or replaced with a new user terminal device, after sending the identity request response packet carrying the first identity set to the first user terminal device, the central office device can further determine whether the first address is parsed again in an identity request packet received within a preset time period.

In a possible implementation, if the first address is parsed again in the identity request packet received by the central office device within the preset time period, it indicates that the first user terminal device is not offline. Because the first user terminal device may periodically send an identity request packet (heartbeat packet function) to the central office device, the central office device may receive the identity request packet again within the preset time period. In this case, the central office device sends an identity request response packet carrying the first identity set to the first user terminal device corresponding to the first address.

In a possible implementation, if the first address is parsed again in the identity request packet received by the central office device within the preset time period, it indicates that the first user terminal device is not offline. In this case, the central office device sends an identity request response packet not carrying the first identity set to the first user terminal device corresponding to the first address.

In a possible implementation, if the first address is not parsed in the identity request packet received by the central office device within the preset time period, but a second address is parsed, and the second address is a physical address of a newly connected user terminal device, it indicates that the first user terminal device is replaced with the newly connected second user terminal device. In this case, the central office device may send an identity request response packet carrying the first identity set to the newly connected user terminal device corresponding to the second address, that is, the central office device reallocates the first identity set to the newly connected user terminal device.

In a possible implementation, if the first address is not parsed in the identity request packet received by the central office device within the preset time period, and the second address of the newly connected user terminal device is not parsed, it indicates that the first user terminal device is offline and that no new user terminal device is currently connected. In this case, the central office device does not temporarily allocate the first identity set to the user terminal device for use.

In this embodiment of this application, when the first user terminal device goes offline, the allocation of the first identity set is suspended. When the first user terminal device is replaced with the newly connected user terminal device, the first identity set is directly allocated to the newly connected user terminal device for use, thereby avoiding waste of identity resources.

Figure 6:
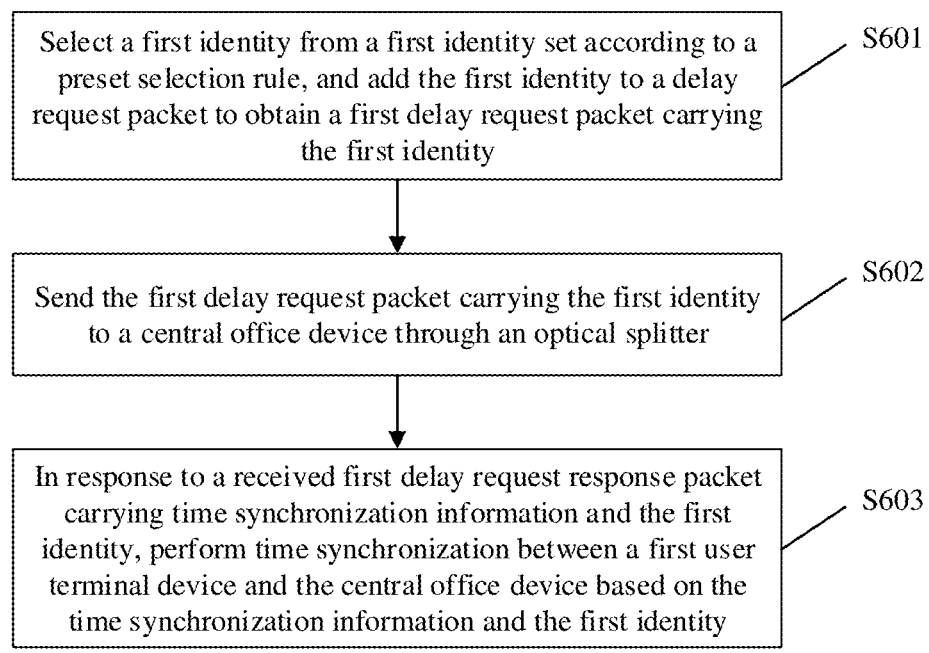
FIG. 6 is a schematic diagram of a method for time synchronization based on an optical transmission network according to an embodiment of this application.

FIG. 6 is a schematic flowchart of a method based on optical transmission according to an embodiment of this application. The method is applied to a first user terminal device, the first user terminal device is optically connected to a central office device through an optical splitter, and the first user terminal device is any one of n user terminal devices. A specific implementation procedure of the method is as follows:

S601: Select a first identity from a first identity set according to a preset selection rule, and add the first identity to a generated delay request packet to obtain a first delay request packet carrying the first identity.

S602: Send the first delay request packet carrying the first identity to the central office device through the optical splitter.

S603: Receive a first delay request response packet carrying time synchronization information and the first identity.

The preset selection rule is used to represent a rule for selecting the first identity from one or more identities.

In this embodiment of this application, the first identity set is an identity set allocated by the central office device to the first user terminal device. Different identity sets are allocated to different user terminal devices, identities in different identity sets are different, and identities in a same identity set are used to distinguish between delay request packets sent by a same user terminal device at different times. A user terminal device sends a delay request packet with an added identity to the central office device, so that the central office device determines, based on the identity, an identity set to which the identity belongs, and determines, based on the identity set, the user terminal device sending the delay request packet. The following describes in detail a process in which the first user terminal device requests the central office device to allocate the first identity set.

Figure 7:
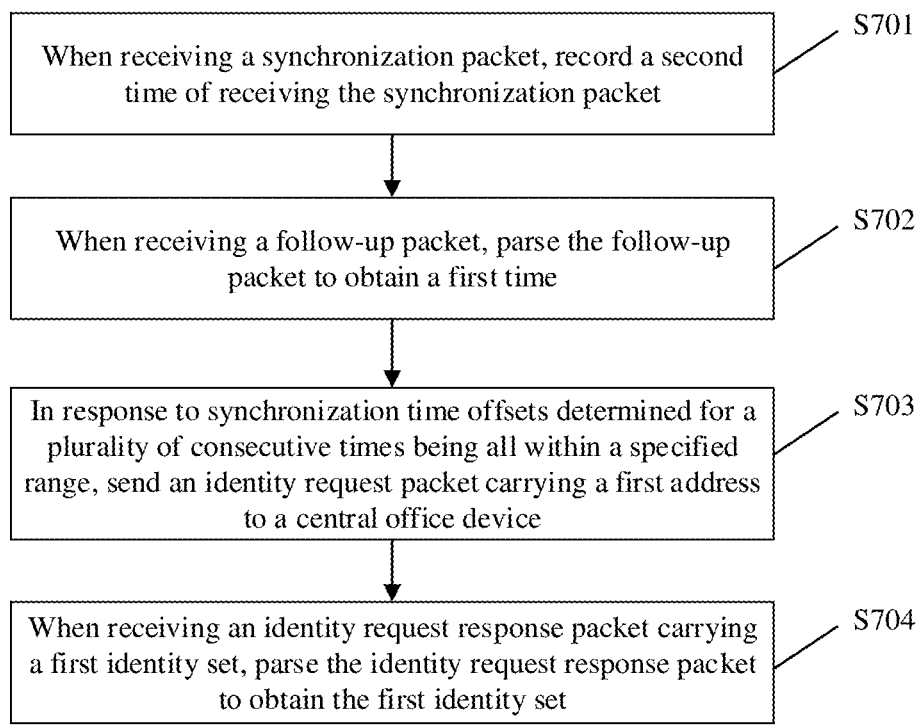
FIG. 7 is a schematic diagram of a procedure in which a user terminal device requests allocation of an identity set according to an embodiment of this application.

FIG. 7 is a schematic diagram of a procedure in which the first user terminal device requests the central office device to allocate the first identity set. The procedure specifically includes the following steps.

S701: When receiving a synchronization packet, record a second time of receiving the synchronization packet.

Specifically, in a process of synchronizing the first user terminal device with the central office device, the central office device may periodically broadcast a synchronization packet to each user terminal device. When receiving a Sync packet, the first user terminal device records a second time of receiving the Sync packet and an ID value of the Sync packet, where the ID value of the Sync packet is used to indicate the number of times that the Sync packet is sent. It should be noted that the second time at which each user terminal device receives the Sync packet is random. For example, the following Table 2 shows the second time at which the n user terminal devices receive the Sync packet broadcast by the central office device.

TABLE 2

| | User terminal device name | | | | |
|---|---|---|---|---|---|
| | ONU 1 | ONU 2 | ONU 3 | . . . | ONU n |
| Time of receiving the Sync packet | t21 | t22 | t23 | . . . | t2n |

S702: When receiving a follow-up packet, parse the follow-up packet to obtain a first time.

In this embodiment of this application, after sending the synchronization packet, the central office device may send a follow-up packet (follow-up packet) carrying the first time to each user terminal device. When receiving the follow-up packet, each user terminal device parses the follow-up packet to obtain the first time at which the central office device sends the Sync packet.

S703: In response to synchronization time offsets determined for a plurality of consecutive times being all within a specified range, send an identity request packet carrying a first address to the central office device.

Specifically, the synchronization time offset is a difference between the second time at which the first user terminal device receives the synchronization packet and the first time at which the central office device sends the synchronization packet. After obtaining the first time and the second time, the first user terminal device calculates the synchronization time offset. Because the central office device periodically sends the synchronization packet and the follow-up packet carrying the first time, a synchronization time offset can be calculated every time the first user terminal device receives the synchronization packet and the follow-up packet. Whether to start to send the identity request packet to the central office device is determined by determining whether synchronization time offsets calculated for a plurality of consecutive times are all within the specified range.

It can be understood that in other embodiments, the synchronization packet and the follow-up packet may also be sent in one packet. For example, a single-step synchronization packet is used to include the synchronization packet and the first time of sending the synchronization packet.

In an embodiment, the first time at which the central office device sends the single-step synchronization packet and the second time at which the first user terminal receives the single-step synchronization packet are obtained in response to the received single-step synchronization packet. The synchronization time offset is determined based on the first time and the second time.

Additionally, the single-step synchronization packet includes the synchronization packet and the follow-up packet corresponding to the synchronization packet. When receiving the follow-up packet, the first user terminal device obtains the first time, and when receiving the synchronization packet, the first user terminal device obtains the second time. In this case, the first user terminal device obtains the synchronization time offset based on the first time and the second time.

When the synchronization time offsets calculated for the plurality of consecutive times are all within the specified range, for example, when synchronization time offsets calculated for three consecutive times are all within a sub-microsecond range, it indicates that the synchronization time offset is stable at a sub-microsecond level. In this case, the first user terminal device starts to send the identity request packet carrying the first address to the central office device. Specifically, the first address is encapsulated into an ID_Req packet (identity request packet), and the ID_Req packet is sent to the central office device. The first address is used to identify the first user terminal device, and the first address is a MAC address of the first user terminal device. The identity request packet may be sent aperiodically or periodically.

When the synchronization time offsets calculated for the plurality of consecutive times are not all within the specified range, for example, when only one synchronization time offset among the synchronization time offsets calculated for three consecutive times is at the sub-microsecond level, the first user terminal device invokes, through a physical hardware clock application programming interface (Physical Hardware Clock Application Programming Interface, PHC API), a PHC clock to adjust the second time of receiving the Sync packet, until the synchronization time offsets calculated for three consecutive times are all at the sub-microsecond level, that is, the synchronization time offset is less than 1 microsecond, indicating that the synchronization time offset is stable at the sub-microsecond level, and then starts to send the identity request packet carrying the first address to the central office device.

After the synchronization time offset becomes stable within the specified range, the identity request packet is sent to the central office device. In this way, a packet loss rate of the identity request packet and a packet loss rate of an identity request response packet can be reduced.

S704: When receiving an identity request response packet carrying the first identity set, parse the identity request response packet to obtain the first identity set.

Specifically, after receiving the identity request packet carrying the first address, the central office device may determine the first user terminal device based on the first address, allocate the first identity set to the first user terminal device for use, and send an ID_Resp packet (identity request response packet) carrying the first identity set to the first user terminal device.

When receiving the ID_Resp packet, the first user terminal device parses the ID_Resp packet to obtain the first identity set, where identities in the first identity set are used to be added to delay request packets generated by the first user terminal device and are used to distinguish between delay request packets sent by the first user terminal device at different times.

In this embodiment of this application, after the first user terminal device determines the first identity set, the first user terminal device may start to perform the operation of S601.

S601: Select the first identity from the first identity set according to the preset selection rule, and add the first identity to the generated delay request packet to obtain the first delay request packet carrying the first identity.

Specifically, the first user terminal device generates the delay request packet, selects the first identity from the first identity set, and adds the first identity to the generated delay request packet to obtain the first delay request packet carrying the first identity, where the preset selection rule herein may be a random selection, as long as a time interval for selecting the same identity is greater than a preset time interval threshold. For example, the preset selection rule may be: selecting the identities in the same identity set in a polling manner, or selecting one identity from the same identity set each time. Further, according to the preset selection rule, a manner of selecting the first identity may be selecting in ascending order or descending order of values of the identities in the first identity set. This is not limited in this embodiment of this application.

For example, assuming that the first identity set is characters 1 to 20, identities are selected in ascending order of the identities. When a first Delay_Req packet (delay request packet) is generated, the first Delay_Req packet is marked with a character 1, that is, an ID of the first Delay_Req packet is 1; when a second Delay_Req packet is generated, an ID of the second Delay_Req packet is 2, and so on, until all the 20 identities are used up. When Delay_Req packets are generated again, the identities in the first identity set are used cyclically.

S602: Send the first delay request packet carrying the first identity to the central office device through the optical splitter.

Specifically, the first user terminal device sends the first delay request packet carrying the first identity to the central office device, and records a third time at which the first delay request packet is sent.

It should be noted that the time at which the n user terminal devices send delay request packets to an optical line terminal is random, and the time at which any two user terminal devices send delay request packets may be the same or different, and the delay request packets may be sent aperiodically (irregularly periodically) or at a preset frequency (regularly periodically). For example, a delay request packet may be sent every 2s.

S603: Receive the first delay request response packet carrying the time synchronization information and the first identity.

In this embodiment of this application, the central office device may determine, based on the identity in the Delay_Req packet (delay request packet), the identity set to which the identity belongs, and then determine, based on a correspondence between the identity set and the user terminal device, the user terminal device corresponding to the identity set. Then a Delay_Resq packet (delay request response packet) carrying the time synchronization information and the first identity is sent to the corresponding user terminal device. The time synchronization information is a receiving time at which the central office device receives the Delay_Resq packet sent by the corresponding user terminal device. The receiving time is recorded as a fourth time. The fourth time is used hereinafter to describe the receiving time at which the Delay_Resq packet is received.

Specifically, the first user terminal device determines whether the first delay request response packet carrying the time synchronization information and the first identity is received. If the first delay request response packet is received, the first delay request response packet is parsed to obtain the time synchronization information and the first identity, and the time synchronization information is the fourth time. In addition, the third time at which the first delay request packet carrying the first identity is sent is obtained based on the first identity, and then a link delay (delay) and a time offset (offset) are calculated based on the obtained first time, second time, third time, and fourth time. Specific calculation formulas are: delay=((t2−t1)+(t4−t3))/2, and offset=((t2−t1)−(t4−t3))/2.

If the first delay request response packet is not received, a second delay request packet carrying a second identity is sent to the central office device again, where the second identity belongs to the first identity set, that is, a new delay request packet is generated again and sent to the optical line terminal.

In a current time synchronization scheme, when a delay request fails, a user terminal device may stop sending a delay request packet, wait for a central office device to start to send a synchronization packet again, and reset an entire synchronization process. However, in this application, when a delay request of the user terminal device fails, that is, when no delay request response packet is received, there is no need to reset the entire synchronization process. Instead, the user terminal device only needs to continue to resend the delay request packet to the central office device. Compared with resetting the entire synchronization process, this processing manner reduces waste of the time and resources and improves efficiency of time synchronization between the user terminal device and the central office device.

Further, after the link delay is determined based on the time synchronization information, it is determined whether link delays determined for a plurality of consecutive times are all less than a preset threshold. Because the first user terminal device continuously sends delay request packets to the central office device, the first user terminal device can determine a link delay every time a delay request response packet carrying time synchronization information and sent by the central office device is received. It is determined whether the link delays determined for the plurality of consecutive times, for example, three consecutive times, are all less than the preset threshold. For example, the preset threshold may be 100 nanoseconds based on an actual requirement, or may be set based on a link delay value specified in the IEEE 1588 protocol. If no, it indicates that the link delay is still unstable. In this case, the first user terminal device continues to resend a delay request packet carrying an identity in the first identity set to the central office device at a first frequency, where the first frequency may be the same as a frequency of a previously sent delay request packet. If yes, it indicates that the link delay is stable. In this case, the first user terminal device resends a delay request packet carrying an identity in the first identity set to the central office device at a second frequency, where the second frequency is lower than the first frequency.

It should be noted that when the user terminal device is not online, an uplink bandwidth is low and uplink traffic is unstable. In this case, the packet loss rate of the delay request packet sent by the user terminal device is high. Therefore, the calculated link delay is unstable, and a probability that the delay request packet is successfully received can be increased by increasing the sending frequency for sending the delay request packet. When the link delays determined for the plurality of consecutive times are all less than the preset threshold, it indicates that an ONU device is online. Therefore, the sending frequency for sending the delay request packet can be reduced, thereby reducing delay request packets and delay request response packets in the optical transmission network and preventing congestion in the optical transmission network.

In summary, according to the foregoing method, an identity set request action is added for each user terminal device to request the central office device to allocate an identity set. The user terminal devices use identities in their identity sets to mark delay request packets generated by the user terminal devices. Therefore, when the central office device receives different delay request packets, the central office device can determine, based on the identities in the delay request packets, the identity sets to which the identities belong, determine the corresponding user terminal devices based on the identity sets, and then send delay request response packets carrying corresponding time synchronization information to the corresponding user terminal devices, thereby avoiding a case that the central office device cannot determine the corresponding user terminal devices.

In addition, the central office device also adds an identity in a received delay request packet to a sent delay request response packet carrying time synchronization information, so that a corresponding user terminal device can obtain, based on the identity, a sending time at which the delay request packet carrying the identity is sent, that is, a third time, where the third time corresponds to the time synchronization information, and then time synchronization is performed based on the third time and the time synchronization information, thereby improving accuracy of time synchronization.

Figure 8:
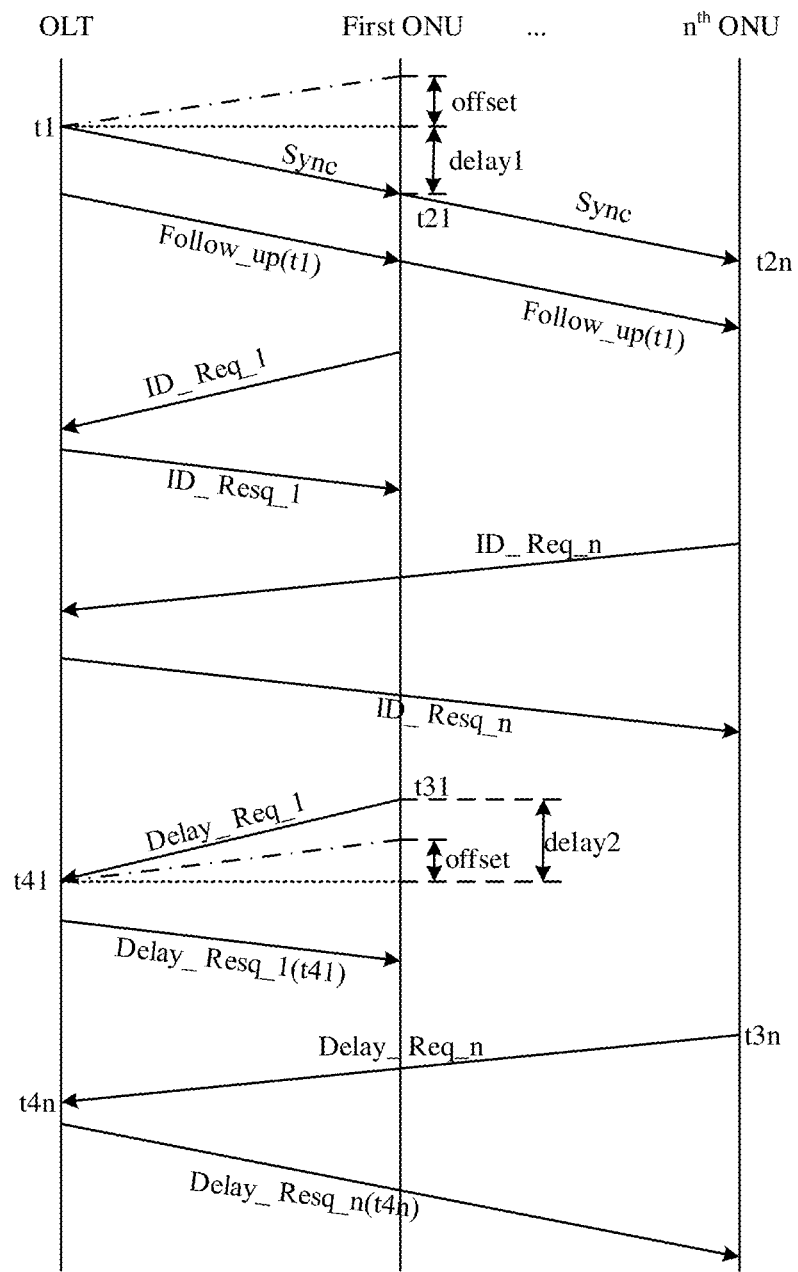
FIG. 8 is a sequence diagram of packets sent by an optical line terminal (Optical Line Terminal, OLT) and an optical network unit (Optical Network Unit, ONU) according to an embodiment of this application.

With reference to a sequence diagram in FIG. 8, a thorough description of a method for time synchronization based on an optical transmission network according to this application is provided by using an example in which a central office device is an OLT device, a user terminal device is an ONU device, and an Ethernet optical split network includes an optical splitter.

With reference to FIG. 8, it can be seen that n ONUs are connected to one OLT.

In an embodiment of this application, the OLT first periodically sends a Sync packet to each ONU and records a timestamp t1 of sending the Sync packet. The Sync packet may be a PTP multicast packet.

When receiving the Sync packet, an ONU may record an ID of the Sync packet and a timestamp t2 of receiving the Sync packet. As shown in FIG. 8, a timestamp of receiving the Sync packet by the first ONU is t21, a timestamp of receiving the Sync packet by the n$^{th}$ ONU is t2n, and so on.

After sending the Sync packet, the OLT may immediately send a follow-up packet to each ONU. The follow-up packet carries the timestamp t1 of sending the Sync packet. The follow-up packet is also a PTP multicast packet.

The ONU captures the follow-up packet, and parses the follow-up packet to obtain the timestamp t1 of sending the Sync packet. When obtaining the timestamp t1 and the timestamp t2, the ONU calculates a synchronization time offset, where the synchronization time offset is a difference between the timestamp t2 and the timestamp t1. The ONU determines whether synchronization time offsets calculated for a plurality of consecutive times (for example, three times) are all within expected time accuracy (for example, at a sub-microsecond level). If yes, it indicates that the synchronization time offset is stable within the expected time accuracy (for example, at the sub-microsecond level). In this case, the ONU starts to send an ID_Req packet to the OLT. If no, it indicates that the synchronization time offset is not stable at the sub-microsecond level. In this case, the ONU invokes a PHC clock (Physical hardware clock, physical hardware clock) through a PHC API to adjust the timestamp t2 of receiving the Sync packet by the ONU, until the synchronization time offsets calculated for three consecutive times are all within the sub-microsecond range, that is, the synchronization time offsets calculated for three consecutive times are all less than 1 microsecond, indicating that the synchronization time offset is stable at the sub-microsecond level.

When the synchronization time offset is stable within the sub-microsecond range, the ONU starts to periodically send an ID_Req packet to the OLT. The ID_Req packet carries a MAC address of the ONU.

After receiving the ID_Req packet, the OLT parses the ID_Req packet to obtain the MAC address, then determines the ONU corresponding to the MAC address, and allocates an identity set, that is, an available ID range, to the ONU. The number of identities in the identity set is calculated based on the preset total number of identities and a maximum split ratio of the optical splitter. For example, the preset total number of identities is 3200, and the maximum split ratio is 1:32, that is, 32 ONUs can be connected to the OLT through the optical splitter. In this case, the number of identities in an identity set of each ONU is 3200÷32=100. Identity sets may be allocated to the ONUs in sequence based on an order of ID_Req packets received. Then an ID_Resp packet carrying an identity set is sent to a corresponding ONU. For example, in FIG. 8, the OLT sends an ID_Resp_1 packet carrying a first identity set to the first ONU, and sends an ID_Resp_n packet carrying an n$^{th}$ identity set to the n$^{th}$ ONU.

After receiving the ID_Resp packet, the ONU parses the ID_Resp packet to obtain the allocated identity set, and every time the ONU sends a Delay_Req packet to the OLT, the ONU selects an identity from the identity set, and adds the identity to the Delay_Req packet. When the ONU sends the Delay_Req packet carrying the identity, the ONU may further record a timestamp t3 of sending the Delay_Req packet. For example, in FIG. 8, a timestamp at which the first ONU sends a Delay_Req_1 packet carrying the identity 1 is t31.

When receiving the Delay_Req packet sent by each ONU, the OLT may record a timestamp t4 of receiving the Delay_Req packet, parse the Delay_Req packet to obtain the identity carried in the Delay_Req packet, determine the identity set to which the identity belongs, and then determine the ONU corresponding to the identity set. Then the OLT sends, to the corresponding ONU, a Delay_Resq packet carrying the timestamp t4 of receiving the Delay_Req packet and the parsed identity. As shown in FIG. 8, a timestamp when the OLT receives the Delay_Req_1 packet sent by the first ONU is t41, and the identity obtained by parsing the Delay_Req_1 packet is 1. Therefore, a Delay_Resq_1 (t41) packet carrying the timestamp t41 and the identity 1 is sent to the first ONU. A timestamp at which the OLT receives a Delay_Req_n packet sent by the n$^{th}$ ONU is t4n, and an identity obtained by parsing the Delay_Req_n packet is n. Therefore, a Delay_Resq_n (t4n) packet carrying the timestamp t4n and the identity n is sent to the n$^{th}$ ONU.

After receiving the Delay_Resq packet, the ONU parses the Delay_Resq packet to obtain the timestamp t4. Then the sending time at which the Delay_Req packet carrying the identity is sent, that is, the timestamp t3, is obtained based on the identity in the Delay_Resq packet. A link delay (delay) and a time offset (offset) are calculated based on the timestamp t1, the timestamp t2, the timestamp t3, and the timestamp t4.

In this embodiment of this application, the OLT serves as a master clock, and the ONU serves as a slave clock. Referring to FIG. 4, a difference between the slave clock and the master clock is a time offset (offset), a transmission delay from the master clock to the slave clock is delay 1, and a transmission delay from the slave clock to the master clock is delay 2. The timestamp t1 and the timestamp t2 satisfy the following equation: t1+offset+delay 1=t2. The timestamp t3 and the timestamp t4 satisfy the following equation: t3−offset+delay 2=t4. In this embodiment of this application, because the packets are all transmitted by using a same physical link, and a transmission delay of the physical link is fixed, it can be considered that delays in both directions are the same, that is, delay=delay 1=delay 2. Therefore, the following can be derived: delay=((t2−t1)+(t4−t3))/2, and offset=((t2−t1)−(t4−t3))/2.

After each ONU calculates its link delay (delay) and time offset (offset), the ONU can implement time synchronization with the OLT based on the link delay (delay) and the time offset (offset).

Figure 9:
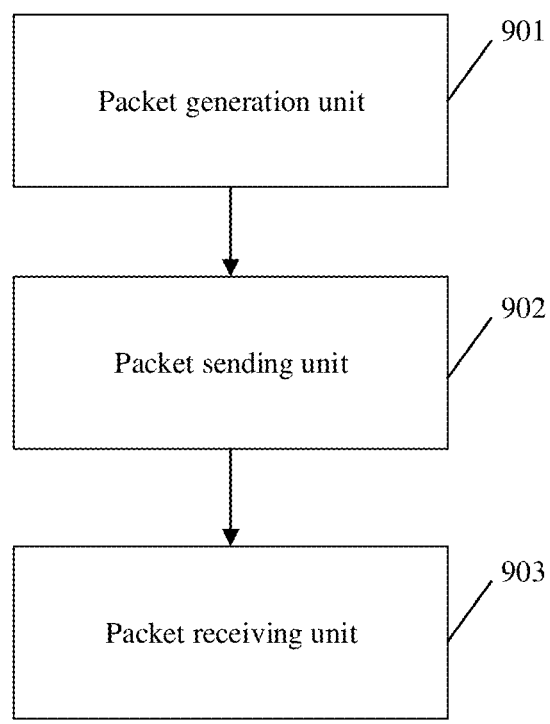
FIG. 9 is a schematic diagram of an apparatus for time synchronization based on an optical transmission network according to an embodiment of this application.

Based on the same inventive concept, this application further provides an apparatus for time synchronization based on an optical transmission network. The apparatus is a first user terminal device, or the apparatus is applied to a first user terminal device, and the first user terminal device is optically connected to a central office device through an optical splitter. Referring to FIG. 9, the apparatus includes:

a packet generation unit 901, configured to select a first identity from a first identity set according to a preset selection rule, and add the first identity to a generated delay request packet to obtain a first delay request packet carrying the first identity, where different identity sets correspond to different user terminal devices, and identities in a same identity set are used to distinguish between delay request packets sent by a same user terminal device at different times;

a packet sending unit 902, configured to send the first delay request packet to the central office device through the optical splitter; and a packet receiving unit 903, configured to receive a first delay request response packet carrying time synchronization information and the first identity, where the time synchronization information is used for time synchronization between the first user terminal device and the central office device.

In an embodiment, the apparatus is further configured to: when receiving an identity request packet, parse the identity request packet to obtain a first address, where the first address is a physical address of the first optical network unit; determine the first optical network unit based on the first address, and allocate the first identity set to the first optical network unit; and send, based on the first address, an identity request response packet carrying the first identity set to the first optical network unit.

In an embodiment, the apparatus is further configured to: in response to determined synchronization time offsets being all within a specified range for a plurality of consecutive times, send an identity request packet carrying a first address to the central office device, where the synchronization time offset is a difference between a time at which the first user terminal device receives a synchronization packet and a time at which the central office device sends the synchronization packet, and the first address is a physical address of the first user terminal device; and when receiving an identity request response packet carrying the first identity set, parse the identity request response packet to obtain the first identity set.

In an embodiment, the packet receiving unit 903 is configured to: determine whether the first delay request response packet carrying the time synchronization information and the first identity is received; and if yes, parse the first delay request response packet to obtain the time synchronization information, and calculate a link delay based on the time synchronization information; or if no, resend a second delay request packet carrying a second identity to the central office device, where the second identity belongs to the first identity set.

In an embodiment, the apparatus is further configured to: determine whether link delays determined for a plurality of consecutive times are all less than a preset threshold; and if no, resend the delay request packet carrying the identity in the first identity set to the central office device at a first frequency; or if yes, resend the delay request packet carrying the identity in the first identity set to the central office device at a second frequency, where the second frequency is lower than the first frequency.

Figure 10:
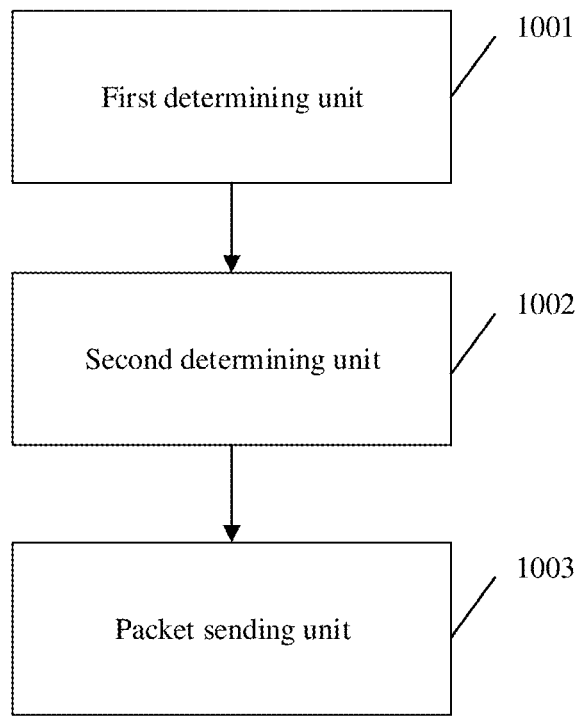
FIG. 10 is a schematic diagram of an apparatus for time synchronization based on an optical transmission network according to an embodiment of this application.

This application further provides an apparatus for time synchronization based on optical communication. The apparatus is a central office device, or the apparatus is applied to a central office device, and the central office device is optically connected to a plurality of user terminal devices through an optical splitter. Referring to FIG. 10, the apparatus includes:

a first determining unit 1001, configured to: when a first delay request packet carrying a first identity and sent by a first user terminal device is received, determine a first identity set to which the first identity belongs, where different identity sets correspond to different user terminal devices, and identities in a same identity set are used to distinguish between delay request packets sent by a same user terminal device at different times;

a second determining unit 1002, configured to determine, based on a correspondence between an identity set and a user terminal device, the first user terminal device corresponding to the first identity set; and a packet sending unit 1003, configured to send a first delay request response packet carrying time synchronization information and the first identity to the first user terminal device through the optical splitter, where the first user terminal device is any one of the plurality of user terminal devices.

In an embodiment, the apparatus is further configured to: when an identity request packet sent by the first user terminal device is received, parse the identity request packet to obtain a first address, where the first address is a physical address of the first user terminal device; determine the first user terminal device based on the first address, and allocate the first identity set to the first user terminal device; and send, based on the first address, an identity request response packet carrying the first identity set to the first user terminal device.

In an embodiment, the apparatus is further configured to: determine whether the first address is parsed again in an identity request packet received within a preset time period; and if yes, send an identity request response packet carrying the first identity set to the first user terminal device corresponding to the first address; or if no, and a second address is parsed in the identity request packet received within the preset time period, send an identity request response packet carrying the first identity set to a second user terminal device corresponding to the second address, where the second address is used to identify the second user terminal device, and the second user terminal device is a newly connected user terminal device.

Figure 11:
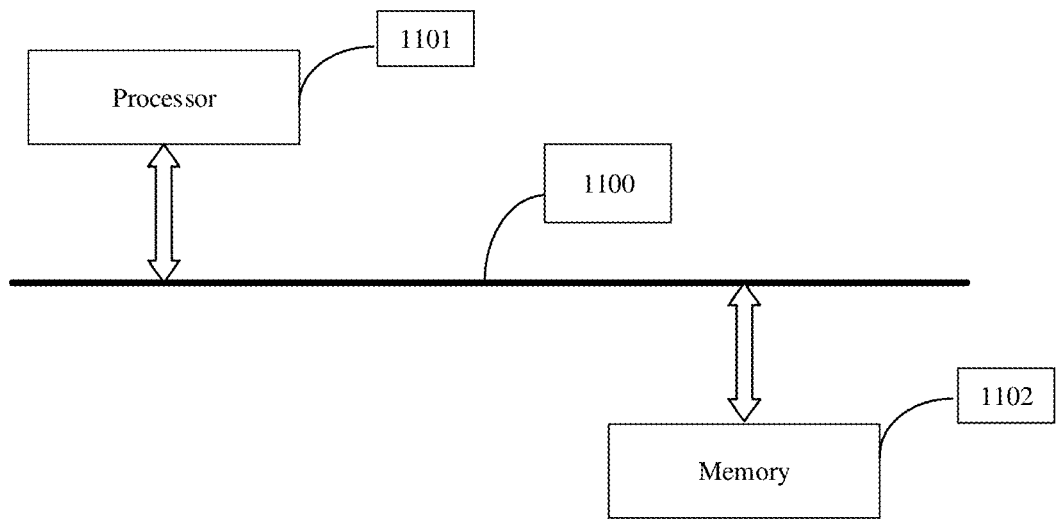
FIG. 11 is a schematic diagram of a structure of an electronic device according to an embodiment of this application.

Based on the same inventive concept, an embodiment of this application further provides an electronic device. The electronic device can implement functions of the foregoing packet sending apparatus for time synchronization. Referring to FIG. 11, the electronic device includes:

at least one processor 1101 and a memory 1102 connected to the at least one processor 1101. A specific connection medium between the processor 1101 and the memory 1102 is not limited in this embodiment of this application. FIG. 11 shows an example in which the processor 1101 and the memory 1102 are connected by a bus 1100. The bus 1100 in FIG. 11 is represented by a bold line. A connection manner between other components is only an example for description and is not limited. The bus 1100 may be classed into an address bus, a data bus, a control bus, and the like. For ease of representation, only one bold line is used to represent the bus in FIG. 11, but this does not mean that there is only one bus or only one type of bus. Alternatively, the processor 1101 may also be referred to as a controller, and the name is not limited.

In this embodiment of this application, the memory 1102 stores instructions executable by the at least one processor 1101. By executing the instructions stored in the memory 1102, the at least one processor 1101 can perform the packet sending method for time synchronization discussed above. The processor 1101 can implement functions of the units in the apparatus shown in FIG. 9 or FIG. 10.

The processor 1101 is a control center of the apparatus, can use various interfaces and lines to connect various parts of the entire control device, and execute various functions and data processing of the apparatus by running or executing the instructions stored in the memory 1102 and invoking data stored in the memory 1102, to perform overall monitoring on the apparatus.

In an embodiment, the processor 1101 may include one or more processing units. An application processor and a modem processor may be integrated in the processor 1101. The application processor mainly processes an operating system, a user interface, an application program, and the like. The modem processor mainly processes wireless communication. It may be understood that the modem processor may alternatively be not integrated in the processor 1101. In some embodiments, the processor 1101 and the memory 1102 may be implemented on a same chip. In some embodiments, the processor 1101 and the memory 1102 may also be implemented separately on separate chips.

The processor 1101 may be a general-purpose processor, for example, a central processing unit (CPU), a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. The steps of the packet sending method for time synchronization disclosed with reference to the embodiments of this application may be directly performed and completed by using a hardware processor, or may be performed and completed by using a combination of hardware in the processor and a software module.

As a non-volatile computer-readable storage medium, the memory 1102 may be configured to store non-volatile software programs, non-volatile computer-executable programs, and modules. The memory 1102 may include at least one type of storage medium, for example, may include a flash memory, a hard disk, a multimedia card, a memory card, a random access memory (Random Access Memory, RAM), a static random access memory (Static Random Access Memory, SRAM), a programmable read-only memory (Programmable Read Only Memory, PROM), a read-only memory (Read Only Memory, ROM), an electrically erasable programmable read-only memory (Electrically Erasable Programmable Read-Only Memory, EEPROM), a magnetic memory, a magnetic disk, an optical disc, or the like. The memory 1102 is but not limited to any other medium that can be used to carry or store desired program code in a form of an instruction or a data structure and can be accessed by a computer. The memory 1102 in the embodiments of this application may alternatively be a circuit or any other apparatus that can implement a storage function, and is configured to store program instructions and/or data.

Based on the design and programming of the processor 1101, code corresponding to the packet sending method for time synchronization described in the foregoing embodiment can be embedded into the chip, so that the chip can perform the steps of the packet sending method for time synchronization in the embodiment shown in FIG. 2 during running. How to design and program the processor 1101 is a technology known to a person skilled in the art, and details are not described herein.

Based on the same inventive concept, an embodiment of this application further provides a storage medium. The storage medium stores computer instructions. When the computer instructions are run on a computer, the computer is enabled to perform the packet sending method for time synchronization discussed above.

In some possible implementations, various aspects of the packet sending method for time synchronization provided in this application can also be implemented in a form of a program product. The program product includes program code. When the program product is run on an apparatus, the program code is used to enable the control device to perform the steps of the packet sending method for time synchronization according to various exemplary implementations of this application described above in this specification.

A person skilled in the art should understand that the embodiments of this application may be provided as a method, an apparatus, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the other programmable device provide steps for implementing a specific function in one or more procedures in the flowcharts and/or in one or more blocks in the block diagrams.

Apparently, a person skilled in the art may make various changes and variations to this application without departing from the spirit and scope of this application. Therefore, this application is intended to cover these modifications and variations of this application provided that they fall within the protection scope defined by the following claims and equivalent technologies thereof.

What is claimed is:

1. A method for time synchronization based on an optical transmission network, applied to a first user terminal device, wherein the first user terminal device is optically connected to a central office device through an optical splitter, and the method comprises:

selecting a first identity from one or more identities in a first identity set according to a preset selection rule, and adding the first identity to a delay request packet to obtain a first delay request packet carrying the first identity, wherein the preset selection rule comprises a rule for selecting the first identity from the one or more identities, the first identity set is used to identify the first user terminal device, and the one or more identities are used to indicate delay request packets sent by the first user terminal device at different times;

sending the first delay request packet to the central office device through the optical splitter; and in response to a received first delay request response packet carrying time synchronization information and the first identity, performing time synchronization between the first user terminal device and the central office device based on the time synchronization information and the first identity.

2. The method according to claim 1, wherein before selecting the first identity from the one or more identities in the first identity set according to the preset selection rule, and adding the first identity to the delay request packet, the method further comprises:

receiving the first identity set from the central office device.

3. The method according to claim 2, wherein receiving the first identity set from the central office device comprises:

in response to a received identity request response packet carrying the first identity set, obtaining the first identity set by parsing the identity request response packet.

4. The method according to claim 1, wherein before the receiving the first identity set from the central office device, the method further comprises:

in response to a number of consecutive times that obtained synchronization time offsets are within a specified range being greater than or equal to a first preset number, sending, to the central office device, an identity request packet carrying a first address corresponding to the first user terminal device; and/or in response to a number of consecutive times that obtained synchronization time offsets are within a specified range being less than a first preset number, performing the time synchronization on the first user terminal device.

5. The method according to claim 4, further comprising:

in response to a received single-step synchronization packet, obtaining a synchronization time offset of the first user terminal device.

6. The method according to claim 5, wherein obtaining the synchronization time offset of the first user terminal device in response to the received single-step synchronization packet comprises:

in response to the received single-step synchronization packet, obtaining a first time at which the central office device sends the single-step synchronization packet and a second time at which the first user terminal receives the single-step synchronization packet; and determining the synchronization time offset based on the first time and the second time.

7. The method according to claim 6, wherein the single-step synchronization packet comprises a synchronization packet and a follow-up packet corresponding to the synchronization packet, and the obtaining, in response to the received single-step synchronization packet, the first time at which the central office device sends the single-step synchronization packet and the second time at which the first user terminal receives the single-step synchronization packet comprises:

in response to the received follow-up packet, obtaining the first time; and in response to the received synchronization packet, obtaining the second time.

8. The method according to claim 5, wherein the single-step synchronization packet comprises port information of the central office device, and the port information indicates a port used to send the single-step synchronization packet.

9. The method according to claim 1, wherein a number of the one or more identities is based on storage space allocated by the central office device for the identities and a maximum split ratio of the optical splitter.

10. The method according to claim 1, wherein the preset selection rule comprises at least one of the following rules:

randomly selecting the first identity from the one or more identities, wherein a time interval between two consecutive selections of the first identity is greater than or equal to a time interval threshold; or selecting the first identity from the one or more identities in a polling manner.

11. The method according to claim 1, wherein the performing the time synchronization between the first user terminal device and the central office device based on the time synchronization information and the first identity comprises:

obtaining, based on the first identity, a third time at which the first user terminal device sends the first delay request packet.

12. The method according to claim 1, wherein the performing the time synchronization between the first user terminal device and the central office device based on the time synchronization information comprises:

obtaining the time synchronization information by parsing the first delay request response packet; and determining a link delay based on the time synchronization information.

13. The method according to claim 12, wherein after determining the link delay based on the time synchronization information, the method further comprises:

in response to a number of consecutive times that the determined link delay is greater than or equal to a preset threshold being greater than or equal to a second preset number, sending a delay request packet to the central office device at a first frequency, wherein the first frequency is used to indicate a frequency at which the first user terminal device sends the delay request packet to the central office device; and in response to a number of consecutive times that the determined link delay is less than the preset threshold being greater than or equal to a third preset number, sending the delay request packet to the central office device at a second frequency, wherein the second frequency is used to indicate a frequency at which the first user terminal device sends the delay request packet to the central office device, and the second frequency is lower than the first frequency.

14. The method according to claim 1, wherein the method further comprises:

when the first delay request response packet carrying the time synchronization information and the first identity is not received within a preset time, sending a second delay request packet carrying a second identity to the central office device, wherein the second identity is an identity selected from the one or more identities according to the preset selection rule, and the second identity is different from the first identity.

15. A non-transitory computer-readable storage medium, wherein a computer program is stored in the computer-readable storage medium, and when the computer program is executed by a processor, the steps of the method according to claim 1 are implemented.

16. A method for time synchronization based on optical communication, wherein the method is applied to a central office device, the central office device is optically connected to a first user terminal device through an optical splitter, and the method comprises:

in response to a received first delay request packet carrying a first identity, determining a first identity set to which the first identity belongs, wherein the first identity set is used to identify the first user terminal device, and one or more identities in the first identity set are used to indicate delay request packets sent by the first user terminal device at different times;

determining, based on a correspondence between the first identity set and the first user terminal device, the first user terminal device corresponding to the first identity set; and sending a first delay request response packet carrying time synchronization information and the first identity to the first user terminal device through the optical splitter, wherein the time synchronization information and the first identity are used by the first user terminal device to perform time synchronization between the first user terminal device and the central office device.

17. The method according to claim 16, wherein before determining the first identity set to which the first identity belongs, the method further comprises:

in response to a received identity request packet sent by the first user terminal device, parsing the identity request packet to obtain a first address, wherein the first address is used to identify the first user terminal device;

determining the first user terminal device based on the first address, and allocating the first identity set to the first user terminal device; and sending, based on the first address, an identity request response packet carrying the first identity set to the first user terminal device.

18. A non-transitory computer-readable storage medium, wherein a computer program is stored in the computer-readable storage medium, and when the computer program is executed by a processor, the steps of the method according to claim 16 are implemented.

19. A system for time synchronization based on optical communication, wherein the system comprises a central office device and a plurality of user terminal devices optically connected to the central office device through an optical splitter, and the plurality of user terminal devices comprise a first user terminal device, wherein the first user terminal device is configured to select a first identity from one or more identities in a first identity set according to a preset selection rule, add the first identity to a delay request packet to obtain a first delay request packet carrying the first identity, and send the first delay request packet carrying the first identity to the central office device;

the central office device is configured to: in response to the received first delay request packet carrying the first identity, determine the first identity set to which the first identity belongs; determine, based on a correspondence between the first identity set and the first user terminal device, the first user terminal device corresponding to the first identity set; and send a first delay request response packet carrying the time synchronization information and the first identity to the first user terminal device; and the first user terminal device is further configured to perform, in response to the received first delay request response packet carrying time synchronization information and the first identity and sent by the central office device, time synchronization between the first user terminal device and the central office device based on the time synchronization information and the first identity, wherein the preset selection rule comprises a rule for selecting the first identity from the one or more identities, the first identity set is used to identify the first user terminal device, and the one or more identities are used to indicate delay request packets sent by the first user terminal device at different times.

\* \* \* \* \*